J. H. OSBORNE.
COMPUTING CHEESE CUTTER.
APPLICATION FILED DEC. 15, 1906.

1,039,179.

Patented Sept. 24, 1912.

Witnesses
Edwin L. Yewell
L. B. Bridges

Inventor
John H. Osborne
By Davis & Davis
Attorneys

UNITED STATES PATENT OFFICE.

JOHN H. OSBORNE, OF ANDERSON, INDIANA.

COMPUTING CHEESE-CUTTER.

1,039,179.

Specification of Letters Patent. Patented Sept. 24, 1912.

Application filed December 15, 1906. Serial No. 348,006.

*To all whom it may concern:*

Be it known that I, JOHN H. OSBORNE, a citizen of the United States of America, and resident of Anderson, county of Madison, State of Indiana, have invented certain new and useful Improvements in Computing Cheese-Cutters, of which the following is a full and clear specification, reference being had to the accompanying drawings, in which—

Figure 1:
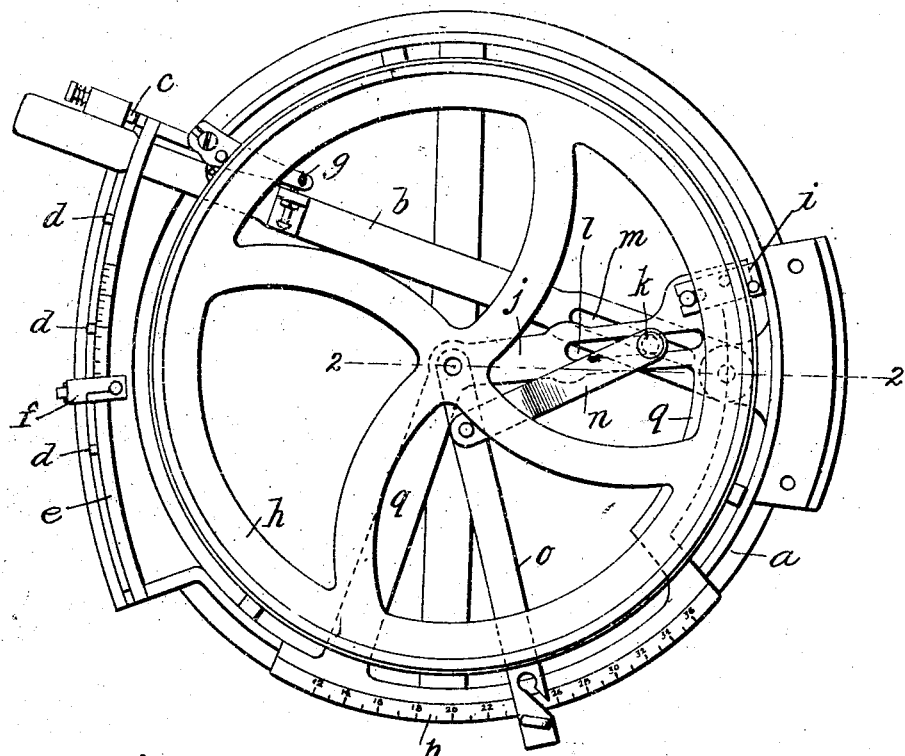
Figure 2:
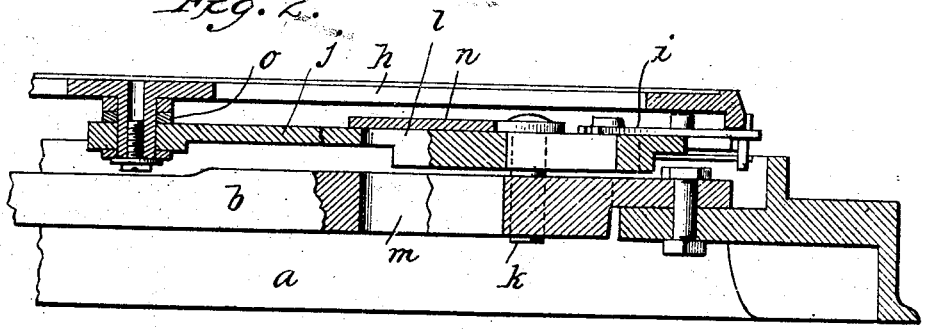

Figure 1 is a plan view showing my invention applied to a cheese-cutter, the knife being removed; and Fig. 2 a transverse vertical section on the line 2—2 of Fig. 1.

I have shown my present improvements applied to the type of cheese-cutter covered by my former patents numbered 797,599 and 835,316 and dated respectively August 22, 1905 and November 6, 1906, but it will be understood that this invention is applicable to other styles of computing cheese-cutters and that therefore I do not desire to limit my claims to that particular type of machine.

The object of this invention is to simplify and reduce to a minimum the cost of manufacture of the scale-controlled means for varying the influence of the movements of the lever upon the cheese-table.

A further object is to increase the accuracy of said scale-controlled means, as more fully hereinafter set forth.

In the drawing, $a$ designates the circular base ring, $b$ the usual actuating lever pivoted at one side to the base and having its free end extending beyond the base of the other side and working between suitable abutments on the base. The free end of this lever carries a spring-actuated stop-pin $c$ which is adapted to engage suitable pins $d$ on the base to measure off fractions of a pound. A price unit scale bar $e$ is secured to the base so as to extend across the free end of the lever, and is provided with a suitable adjustable stop $f$ whereby the cheese may be measured off by value. A suitable table arrester $g$ is provided to arrest the momentum of the table. The movement of the lever is communicated to the rotary table $h$ through the medium of a spring actuated clutch $i$ of any suitable construction carried on one corner of a segmental frame embodying an arm $j$. A vertical pin $k$ connects said radial arm slidably and pivotally to the lever. The arm $j$ is longitudinally slotted at $l$, and the lever is similarly slotted at $m$, and the pin $k$ works in these slots. This pin $k$ is supported in the slots by means of a link $n$ whose inner end is pivotally connected to a radial scale arm $o$, whose outer end projects beyond the cheese-table and is adapted to be moved along a curved scale plate $p$ and be suitably clamped in its adjusted position. The scale plate $p$, in the present instance, is provided with divisions and numerals indicating total weights of cheeses. This scale plate is suitably connected by arms $q$ to the arm $j$ so that when said radial arm is vibrated the scale plate will be moved in unison therewith, as likewise will be the link $n$ and adjusting arm $o$.

The cheese having been weighed and its total weight ascertained, it is placed upon the table and the arm $o$ adjusted to the figures indicating the total weight. Then each vibration of the lever the full distance between the abutments will measure off one full pound. If fractions of a pound are desired, the pin $c$ may be pressed in to engage the desired one of the pins $d$. If it is desired to measure off the cheese by value, the price unit stop may be used in the usual manner.

It is obvious that instead of placing a total weight scale on the scale plate $p$ I may place thereon a total value scale so that uniform movements of the lever will measure off segments of cheese of uniform value. this case the price bar $e$ will be unnecessary, and the pins $d$ may be set at such distances as to enable the operator to measure off by any unit of value desired.

Instead of the stop pins to regulate the movement of the lever it is obvious that I may employ the scale bar and pointer on the lever well known in this art.

It will be observed that by the construction set forth I avoid entirely mounting the scale and its adjusting devices upon the lever, thus reducing the expense of manufacture. This new arrangement also permits me to use much larger graduations on my scale, thus contributing greatly to accuracy in measuring off the segments.

Having thus fully described my invention, what I claim and desire to secure by Letters Patent is:—

1. In a computing cheese-cutter, the combination of a base and a rotary table mounted thereon, a vibrating operating lever, a pivot therefor at its inner end, a pivoted arm, means for pivotally and slidably connecting this arm to the lever and means on the arm for engaging the cheese table, a scale carried by the arm, and means working over this scale and movable with it for varying the influence of the lever upon the table.

2. In a computing cheese-cutter, the combination of a base and a rotary table mounted thereon, a vibrating operating lever, a pivoted arm, means for pivotally connecting this arm to the lever and means on the arm for engaging the cheese table, a scale carried by the arm, and means working over this scale for varying the influence of the lever upon the table.

3. In a computing cheese cutter, the combination of a base, a rotary table thereon, an operating handle and means for limiting its stroke, a clutch-carrying part and means connecting it to the operating handle, said clutch-carrying part carrying also a scale, and means over this scale for varying the influence of the operating handle upon the table.

4. In a computing cheese cutter, the combination of a base, a rotary table, an operating lever, a pivoted member carrying a table clutch and operatively connected to said lever, a curved scale lying beyond the edge of the table and carried by said pivoted member, and means working over this scale and movable with it for varying the influence of the lever upon the table.

In testimony whereof I hereunto affix my signature in the presence of two witnesses this 12th day of December 1906.

JOHN H. OSBORNE.

Witnesses:
GLAD. S. KING,
GUS. A. EITELMANN.

Copies of this patent may be obtained for five cents each, by addressing the "Commissioner of Patents, Washington, D. C."